US012148375B2

(12) United States Patent
Wang et al.

(10) Patent No.: US 12,148,375 B2
(45) Date of Patent: Nov. 19, 2024

(54) PIXEL CIRCUIT, DRIVING METHOD AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Benlian Wang, Beijing (CN); Chengjie Qin, Beijing (CN); Cong Liu, Beijing (CN); Yao Huang, Beijing (CN); Yue Long, Beijing (CN); Weiyun Huang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/800,672

(22) PCT Filed: Sep. 18, 2021

(86) PCT No.: PCT/CN2021/119407

§ 371 (c)(1),
(2) Date: Aug. 18, 2022

(87) PCT Pub. No.: WO2023/039893

PCT Pub. Date: Mar. 23, 2023

(65) Prior Publication Data

US 2024/0221642 A1 Jul. 4, 2024

(51) Int. Cl.
*G09G 3/3233* (2016.01)

(52) U.S. Cl.
CPC ... *G09G 3/3233* (2013.01); *G09G 2310/0243* (2013.01); *G09G 2320/0257* (2013.01); *G09G 2330/04* (2013.01)

(58) Field of Classification Search
CPC ............. G09G 3/3233; G09G 2330/04; G09G 2310/0243; G09G 2320/0257
See application file for complete search history.

(56) References Cited

U.S. PATENT DOCUMENTS

2005/0017934 A1 1/2005 Chung et al.
2016/0240127 A1 8/2016 Duan et al.
(Continued)

FOREIGN PATENT DOCUMENTS

CN 100386794 C 5/2008
CN 107301844 A 10/2017
(Continued)

*Primary Examiner* — Nelson M Rosario
*Assistant Examiner* — Scott D Au
(74) *Attorney, Agent, or Firm* — IPro, PLLC

(57) ABSTRACT

The present disclosure provides a pixel circuit, a driving method and a display device. The pixel circuit includes a light-emitting element, a driving circuit, a first light-emitting control circuit, a first control circuit, a first initialization circuit and a second light-emitting control circuit. The first control circuit is configured to control to connect the first node and the control node under the control of a first scan signal; the first initialization circuit is configured to write a first initial voltage into the control node under the control of a second light-emitting control signal; the first light-emitting control circuit is configured to control to connect the power supply voltage terminal and the second node under the control of the second light-emitting control signal.

20 Claims, 5 Drawing Sheets

(56) References Cited

U.S. PATENT DOCUMENTS

| | | | | |
|---|---|---|---|---|
| 2020/0051491 | A1 | 2/2020 | Xuan et al. | |
| 2020/0273410 | A1* | 8/2020 | Yu | G09G 3/3233 |
| 2021/0174743 | A1* | 6/2021 | Chang | G09G 3/3291 |
| 2022/0375395 | A1 | 11/2022 | Zhao et al. | |
| 2023/0360600 | A1* | 11/2023 | Wang | G09G 3/3266 |

FOREIGN PATENT DOCUMENTS

| | | | | | |
|---|---|---|---|---|---|
| CN | 107610640 | A | | 1/2018 | |
| CN | 111524486 | A | | 8/2020 | |
| CN | 111696486 | A | | 9/2020 | |
| CN | 113066435 | A | | 7/2021 | |
| CN | 113327543 | A | | 8/2021 | |
| KR | 20190013134 | A | * | 2/2019 | G09G 3/32 |

* cited by examiner

PIXEL CIRCUIT, DRIVING METHOD AND DISPLAY DEVICE

CROSS-REFERENCE TO RELATED APPLICATION

This application is the U.S. national phase of PCT Application No. PCT/CN2021/119407 filed on Sep. 18, 2021, which is incorporated herein by reference in its entirety.

TECHNICAL FIELD

The present disclosure relates to the field of display technology, in particular to a pixel circuit, a driving method and a display device.

BACKGROUND

In the related art, there is a parasitic capacitor between the gate electrode and the source electrode of the driving transistor in the pixel driving circuit. In the reset phase of the pixel driving circuit, the gate voltage of the driving transistor is initialized to an initial voltage. Under the coupling effect of the parasitic capacitor, the source voltage of the driving transistor also changes accordingly. When different gray-scales are reset in the reset phase, the change amount of the gate voltage of the driving transistor are different, and thus the source voltage of the driving transistor also changes in different amounts, so that source voltage of the driving transistor is different after the reset phase is completed, the gate-source voltage Vgs of the driving transistor is also different. At the same time, since the gate-source voltage Vgs of the driving transistor will affect the threshold voltage the driving transistor, an afterimage problem will occur in the display panel.

SUMMARY

In a first aspect, the present disclosure provides in some embodiments a pixel circuit, including a light-emitting element, a driving circuit, a first light-emitting control circuit, a first control circuit, a first initialization circuit and a second light-emitting control circuit, the first control circuit is electrically connected to a first scan line, a first node and a control node respectively, and is configured to control to connect the first node and the control node under the control of a first scan signal provided by the first scan line; the first initialization circuit is respectively electrically connected to a second light-emitting control line, a first initial voltage terminal and the control node, and is configured to write a first initial voltage provided by the first initial voltage terminal into the control node under the control of a second light-emitting control signal provided by the second light-emitting control line; the first light-emitting control circuit is respectively electrically connected to the second light-emitting control line, a power supply voltage terminal and a second node, and is configured to control to connect the power supply voltage terminal and the second node under the control of the second light-emitting control signal; the second light-emitting control circuit is respectively electrically connected to the first light-emitting control line, a third node and a first electrode of the light-emitting element, and is configured to control to connect the third node and the first electrode of the light-emitting element under the control of the first light-emitting control signal provided by the first light-emitting control line; a control end of the driving circuit is electrically connected to the first node, the first end of the driving circuit is electrically connected to the second node, the second end of the driving circuit is electrically connected to the third node, the driving circuit is configured to control to connect the second node and the third node under the control of a potential of the first node; a second electrode of the light-emitting element is electrically connected to the first voltage terminal.

Optionally, the pixel circuit further includes a compensation control circuit and a data writing-in circuit; the compensation control circuit is electrically connected to the first scan line, the control node and the third node respectively, and is configured to control to connect the control node and the third node under the control of the first scan signal provided by the first scan line; the data writing-in circuit is electrically connected to the second scan line, the data line and the second node respectively, and is configured to write a data voltage on the data line into the second node under the control of the second scan signal.

Optionally, the pixel circuit further includes a second initialization circuit; the second initialization circuit is respectively electrically connected to the second scan line, the second initial voltage terminal and the first electrode of the light-emitting element, and is configured to write the second initial voltage provided by the second initial voltage terminal into the first electrode of the light-emitting element under the control of the second scan signal provided by the second scan line.

Optionally, the pixel circuit further includes an energy storage circuit; the first end of the energy storage circuit is electrically connected to the first node, the second end of the energy storage circuit is electrically connected to the power supply voltage terminal, and the energy storage circuit is configured to store electrical energy and control the potential of the first node.

Optionally, transistors included in the first light-emitting control circuit, transistors included in the second light-emitting control circuit, and transistors included in the first initialization circuit are all p-type transistors, the first light-emitting control signal and the second light-emitting control signal are provided by a same light-emitting control signal generating circuit, the first light-emitting control signal is the nth stage of light-emitting control signal provided by the light-emitting control signal generating circuit, the second light-emitting control signal is the (n+1)th stage of light-emitting control signal provided by the light-emitting control signal generating circuit, and n is a positive integer.

Optionally, transistors included in the first control circuit, transistors included in the data writing-in circuit, and transistors included in the compensation control circuit are all p-type transistors, and the first scan signal and the second scan signal are provided by the same scan signal generating circuit; the first scan signal is the mth stage of scan signal provided by the scan signal generating circuit, the second scan signal is the (m+1)th stage of scan signal provided by the scan signal generating circuit, and m is a positive integer.

Optionally, the first control circuit comprises a first transistor, and the first initialization circuit comprises a second transistor; a control electrode of the first transistor is electrically connected to the first scan line, a first electrode of the first transistor is electrically connected to the control node, and a second electrode of the first transistor is electrically connected to the first node; a control electrode of the second transistor is electrically connected to the second light-emitting control line, a first electrode of the second transistor is electrically connected to the first initial voltage terminal, and a second electrode of the second transistor is electrically connected to the control node.

Optionally, the first transistor is a dual-gate transistor; or the first transistor is an oxide transistor.

Optionally, the first light-emitting control circuit includes a third transistor, and the second light-emitting control circuit includes a fourth transistor; a control electrode of the third transistor is electrically connected to the second light-emitting control line, a first electrode of the third transistor is electrically connected to the power supply voltage terminal, and a second electrode of the third transistor is electrically connected to the second node; a control electrode of the fourth transistor is electrically connected to the first light-emitting control line, a first electrode of the fourth transistor is electrically connected to the third node, and a second electrode of the fourth transistor is electrically connected to the first electrodes of the light-emitting element.

Optionally, the compensation control circuit comprises a fifth transistor, and the data writing-in circuit comprises a sixth transistor; a control electrode of the fifth transistor is electrically connected to the first scan line, a first electrode of the fifth transistor is electrically connected to the control node, and a second electrode of the fifth transistor is electrically connected to the third node; a control electrode of the sixth transistor is electrically connected to the second scan line, a first electrode of the sixth transistor is electrically connected to the data line, and a second electrode of the sixth transistor is electrically connected to the second node.

Optionally, the second initialization circuit comprises a seventh transistor; a control electrode of the seventh transistor is electrically connected to the second scan line, a first electrode of the seventh transistor is electrically connected to the second initial voltage terminal, and a second electrode of the seventh transistor is electrically connected to the first electrode of the light-emitting element.

Optionally, the energy storage circuit includes a storage capacitor, and the driving circuit includes a driving transistor; a control electrode of the driving transistor is electrically connected to the first node, a first electrode of the driving transistor is electrically connected to the second node, and a second electrode of the driving transistor is electrically connected to the third node; a first end of the storage capacitor is electrically connected to the first node, and the second end of the storage capacitor is electrically connected to the power supply voltage terminal.

In a second aspect, an embodiment of the present disclosure provides a driving method, applied to the pixel circuit, a display period includes an initialization phase; the driving method includes: in the initialization phase, controlling, by the first light-emitting control circuit, to connect the power supply voltage terminal and the second node under the control of the second light-emitting control signal; controlling, by the first initialization circuit, to write the first initial voltage into the control node under the control of the second light-emitting control signal, and controlling, by the first control circuit, to connect the first node and the control node under the control of the first scan signal, so as to write the first initial voltage into the first node.

Optionally, the pixel circuit further comprises a compensation control circuit, a data writing-in circuit and an energy storage circuit; the display period further comprises a data writing-in phase and a light-emitting phase arranged after the initialization phase; the driving method also includes: in the data writing-in phase, writing, by the data writing-in circuit, the data voltage into the second node under the control of the second scan signal, and controlling, by the compensation control circuit, to connect the third node and the control node under the control of the first scan signal; at the beginning of the data writing-in phase, controlling, by the driving circuit, to connect the second node and the third node under the control of the potential of the first node, so as to charge the energy storage circuit through the data voltage and change the potential of the first node, until the driving circuit is turned off; in the light-emitting phase, controlling, by the first light-emitting control circuit, to connect the power supply voltage terminal and the first end of the driving circuit under the control of the second light-emitting control signal, and controlling, by the second light-emitting control circuit, to connect the second end of the driving circuit and the first electrode of the light-emitting element under the control of the first light-emitting control signal, and driving, by the driving circuit, the light-emitting element to emit light.

Optionally, the pixel circuit further comprises a second initialization circuit, the driving method further includes: in the data writing-in phase, writing, by the second initializing circuit, a second initial voltage into the first electrode of the light-emitting element, so that the light-emitting element does not emit light.

Optionally, the display period further includes a preset phase that is set before the initialization phase and is immediately adjacent to the initialization phase, and the driving method further includes: in the preset phase, the initialization phase, and the data writing-in phase, controlling, by the second light-emitting control circuit, to disconnect the second end of the driving circuit from the first electrode of the light-emitting element under the control of the first light-emitting control signal.

In a third aspect, an embodiment of the present disclosure provides a display device including a pixel circuit.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative work shall fall within the protection scope of the present disclosure.

The transistors used in all the embodiments of the present disclosure may be triodes, thin film transistors, field effect transistors, or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a thin film transistor or a field effect transistor, the first electrode may be a drain electrode, and the second electrode may be a source electrode; or, the first electrode may be a source electrode, the second electrode may be a drain electrode.

Figure 1:
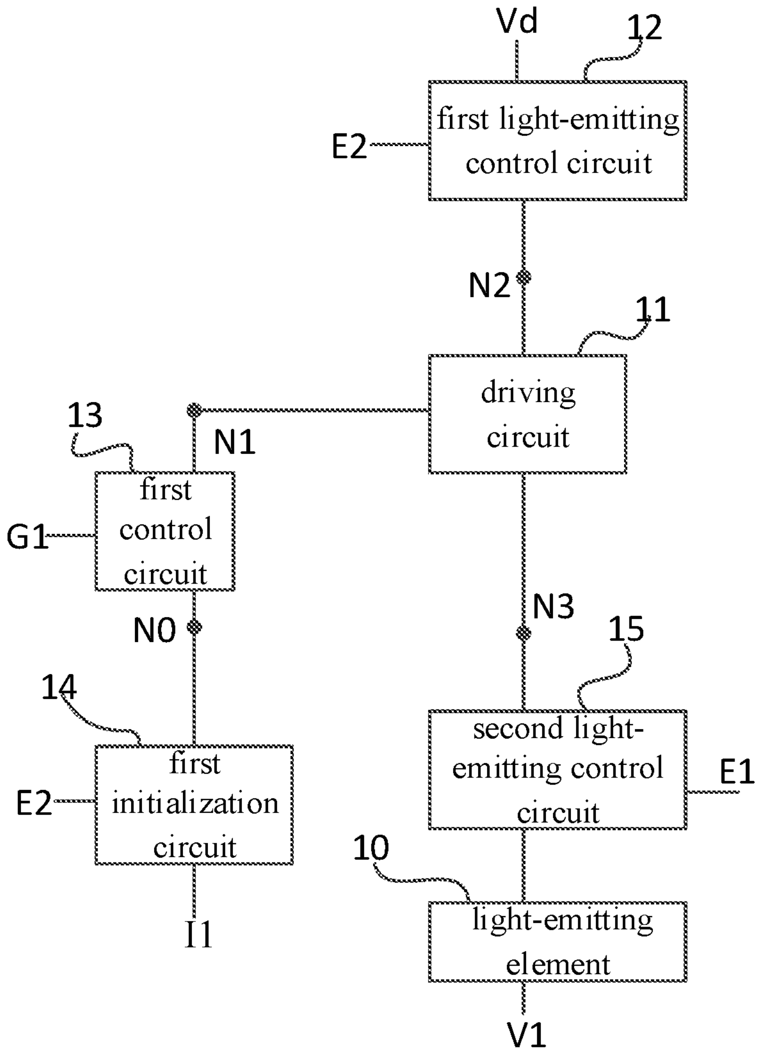
FIG. 1 is a structural diagram of a pixel circuit according to an embodiment of the present disclosure.

As shown in FIG. 1, the pixel circuit according to the embodiment of the present disclosure includes a light-emitting element 10, a driving circuit 11, a first light-emitting control circuit 12, a first control circuit 13, a first initialization circuit 14 and a second light-emitting control circuit 15;

The first control circuit 13 is electrically connected to a first scan line G1, a first node N1 and a control node N0 respectively, and is configured to control to connect the first node N1 and the control node N0 under the control of a first scan signal provided by the first scan line G1;

The first initialization circuit 14 is respectively electrically connected to a second light-emitting control line E2, a first initial voltage terminal I1 and the control node N0, and is configured to write a first initial voltage Vi1 provided by the first initial voltage terminal I1 into the control node N0 under the control of a second light-emitting control signal provided by the second light-emitting control line E2;

The first light-emitting control circuit 12 is respectively electrically connected to the second light-emitting control line E2, a power supply voltage terminal Vd and a second node N2, and is configured to control to connect the power supply voltage terminal Vd and the second node N2 under the control of the second light-emitting control signal; the power supply voltage terminal Vd is used to provide a power supply voltage VDD;

The second light-emitting control circuit 15 is respectively electrically connected to the first light-emitting control line E1, a third node N3 and a first electrode of the light-emitting element 10, and is configured to control to connect the third node N3 and the first electrode of the light-emitting element 10 under the control of the first light-emitting control signal provided by the first light-emitting control line E1;

A control end of the driving circuit 11 is electrically connected to the first node N1, the first end of the driving circuit 11 is electrically connected to the second node N2, the second end of the driving circuit 11 is electrically connected to the third node N3, the driving circuit 11 is configured to control to connect the second node N2 and the third node N3 under the control of a potential of the first node N3;

A second electrode of the light-emitting element 10 is electrically connected to the first voltage terminal V1.

In at least one embodiment of the present disclosure, the first voltage terminal V1 may be a low voltage terminal or a ground terminal, but not limited thereto.

In a specific implementation, the light-emitting element 10 may be an organic light-emitting diode, the first electrode of the light-emitting element 10 may be an anode, and the second electrode of the light-emitting element 10 may be a cathode; but not limited thereto.

In the pixel circuit described in the embodiment of the present disclosure, the first control circuit 13 is directly electrically connected to the first node N1, and the first initialization circuit 14 is not directly electrically connected to the first node N1, so as to reduce the current leakage path of the first node N1, to ensure the stability of the voltage of the first node during low frequency operation, which is beneficial to improve the display quality, improve the display uniformity, and reduce the flicker.

When the embodiment of the pixel circuit shown in FIG. 1 of the present disclosure is in operation, the display period includes an initialization phase arranged before the data writing-in phase;

In the initialization phase, under the control of the first scan signal, the first control circuit 13 controls to connect the first node N1 and the control node N0, and the first initialization circuit 14 controls to write the first initial voltage Vi1 into the control node N0 under the control of the second light-emitting control signal, to initialize the potential of N1 to Vi1; the first light-emitting control circuit 12 controls to connect the power supply voltage terminal Vd and the second node N2 under the control of the second light-emitting control signal, to initialize the potential of the second node N2 to VDD.

The pixel circuit described in the embodiment of the present disclosure includes a first control circuit 13, a first initialization circuit 14 and a first light-emitting control circuit 12. Before the data voltage is written to the first end of the driving circuit 11, the first control circuit 13 and the first initialization circuit 14 controls to write the first initial voltage Vi1 into the control node N0, so as to initialize the potential of N1 to Vi1; the first light-emitting control circuit 12 controls to write the power supply voltage VDD into the first terminal of the driving circuit 11 under the control of the second light-emitting control signal, to provide a bias voltage to the driving transistor in the driving circuit 11, to keep the driving transistor in a reset state, to improve the hysteresis of the driving transistor, and eliminate afterimages.

In specific implementation, the hysteresis of the driving transistor will cause a low characteristic response of the driving transistor. However, before the data voltage is written, the gate-source voltage of the driving transistor is quickly reset, which is beneficial to improve the recovery speed of the driving transistor, improve the hysteresis of the driving transistor and improve the hysteresis recovery speed.

In addition, in the pixel circuit described in the embodiment of the present disclosure, the first light-emitting control circuit 12 is electrically connected to the second light-emitting control line E2, and is in operation under the control of the second light-emitting control signal provided by the second light-emitting control line E2. The second light-emitting control circuit 15 is electrically connected to the first light-emitting control line E1, and is in operation under the control of the first light-emitting control signal provided by the first light-emitting control line E1 to ensure the normal operation of the timing in the light-emitting phase and ensure the display effect.

Figure 2:
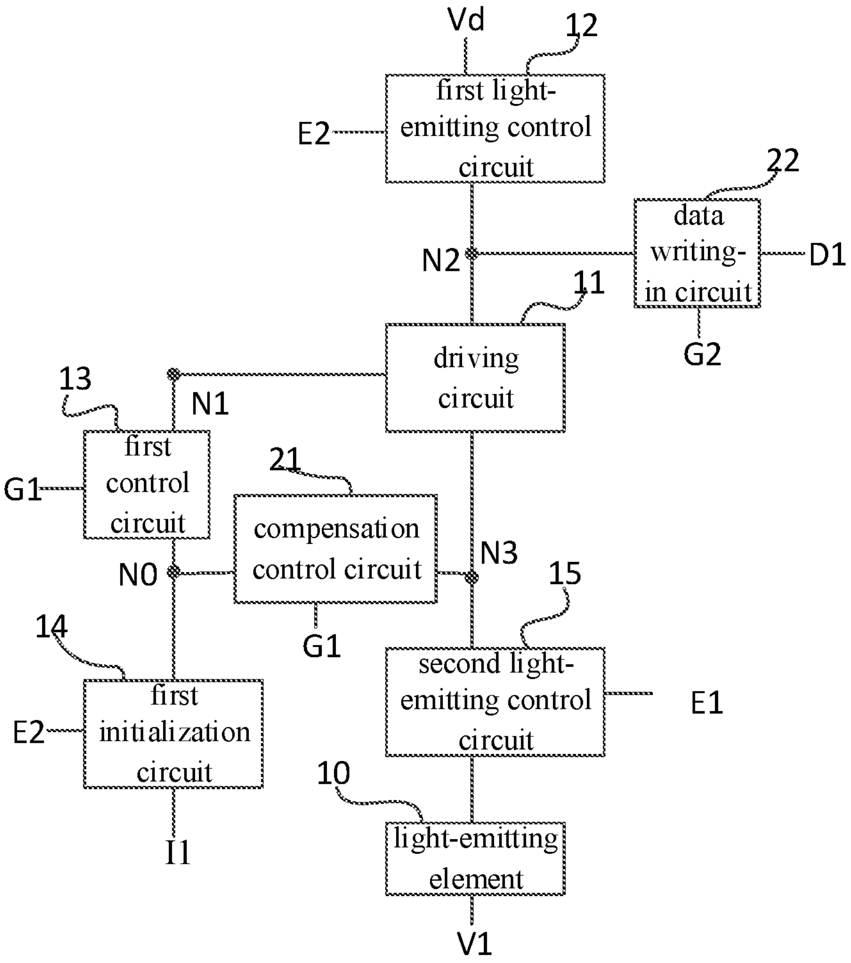
FIG. 2 is a structural diagram of a pixel circuit according to at least one embodiment of the present disclosure.

As shown in FIG. 2, on the basis of the embodiment of the pixel circuit shown in FIG. 1, the pixel circuit described in at least one embodiment of the present disclosure further includes a compensation control circuit 21 and a data writing-in circuit 22;

The compensation control circuit 21 is electrically connected to the first scan line G1, the control node N0 and the third node N3 respectively, and is configured to control to connect the control node N0 and the third node N3 under the control of the first scan signal provided by the first scan line G1;

The data writing-in circuit 22 is electrically connected to the second scan line G2, the data line D1 and the second node N2 respectively, and is configured to write a data voltage Vdata on the data line D1 into the second node N2 under the control of the second scan signal.

In at least one embodiment of the pixel circuit shown in FIG. 2 of the present disclosure, the first control circuit 13 is in operation under the control of the first scan signal provided by the first scan line G1, and the compensation control circuit 21 is in operation under the control of the first scanning signal provided by the first scan line G1, and the data writing-in circuit 22 is in operation under the control of the second scanning signal provided by the second scanning line G2. The normal operation of the timing of the initialization and data writing-in can be ensured through the cooperation of the scanning signals, so as to ensure initialization and threshold voltage compensation effect.

Optionally, the pixel circuit described in at least one embodiment of the present disclosure further includes a second initialization circuit;

The second initialization circuit is respectively electrically connected to the second scan line, the second initial voltage terminal and the first electrode of the light-emitting element, and is configured to write the second initial voltage provided by the second initial voltage terminal into the first electrode of the light-emitting element under the control of the second scan signal provided by the second scan line, so as to control the light-emitting element not to emit light, and remove the residual charge of the first electrode of the light-emitting element.

The pixel circuit described in at least one embodiment of the present disclosure may further include an energy storage circuit;

The first end of the energy storage circuit is electrically connected to the first node, the second end of the energy storage circuit is electrically connected to the power supply voltage terminal, and the energy storage circuit is configured to store electrical energy and control the potential of the first node.

Figure 3:
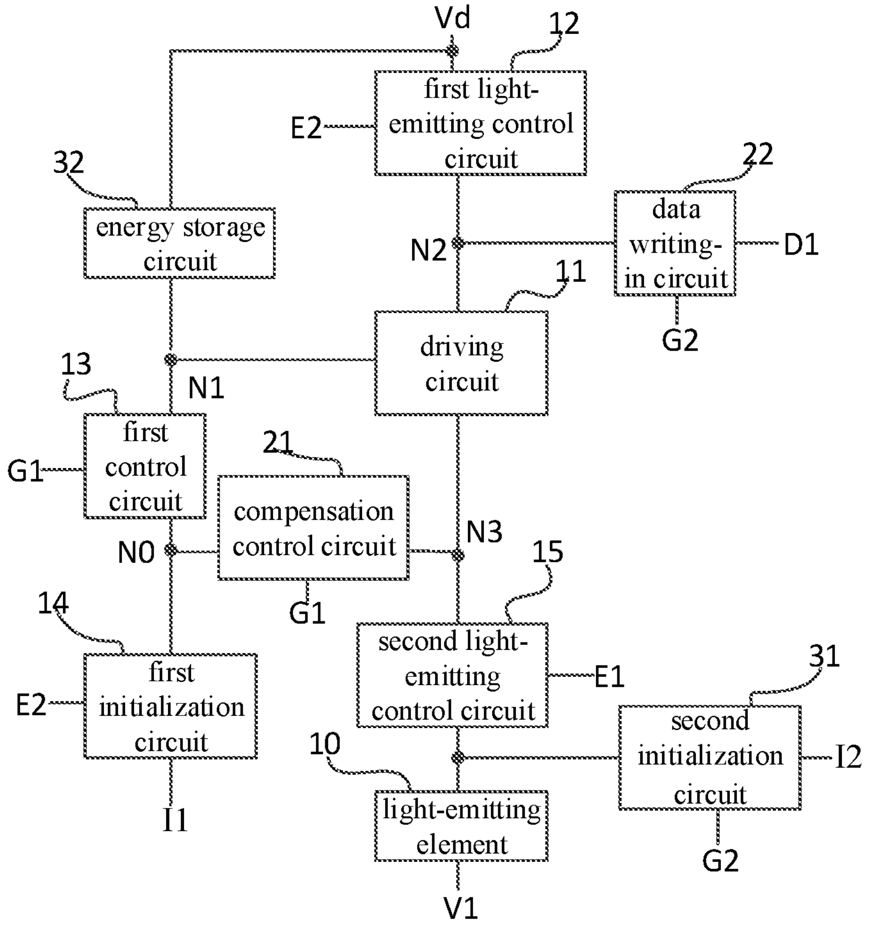
FIG. 3 is a structural diagram of a pixel circuit according to at least one embodiment of the present disclosure.

As shown in FIG. 3, on the basis of at least one embodiment of the pixel circuit shown in FIG. 2, the pixel circuit according to at least one embodiment of the present disclosure further includes a second initialization circuit 31 and an energy storage circuit 32;

The second initialization circuit 31 is respectively electrically connected to the second scan line G2, the second initial voltage terminal I2, and the first electrode of the light-emitting element 10, and is configured to write the second initial voltage Vi2 provided by the second initial voltage terminal I2 into the first electrode of the light-emitting element 10 under the control of the second scan signal provided by the second scan line G2, to control the light-emitting element 10 not to emit light and remove the residual charge of the first electrode of the light-emitting element 10;

The first end of the energy storage circuit 32 is electrically connected to the first node N1, the second end of the energy storage circuit 32 is electrically connected to the power supply voltage terminal Vd, and the energy storage circuit 32 is configured to store electrical energy and control the potential of the first node N1.

In at least one embodiment of the present disclosure, the first initial voltage terminal I1 and the second initial voltage terminal I2 may be different initial voltage terminals, or may be the same initial voltage terminal.

When the first initial voltage terminal I1 and the second initial voltage terminal I2 are the same initial voltage terminal, the number of voltage terminals can be reduced, thereby saving space.

When at least one embodiment of the pixel circuit shown in FIG. 3 of the present disclosure is in operation, the display period further includes a data writing-in phase and a light-emitting phase arranged after the initialization phase;

In the data writing-in phase, the second initialization circuit 32 writes the second initial voltage Vi2 into the first electrode of the light-emitting element 10 under the control of the second scan signal, so that the light-emitting element 10 does not emit light; the data writing-in circuit 22 writes the data voltage Vdata into the second node N2 under the control of the second scan signal; the compensation control circuit 21 controls to connect the third node N3 and the control node N0 under the control of the first scan signal, the first control circuit 13 controls to connect the first node N1 and the control node N0 under the control of the first scan signal, to control to connect the first node N1 and the third node N3; the second initialization circuit 31 writes the second initial voltage Vi2 into the first electrode of the light-emitting element 10 under the control of the second scan signal, to control the light-emitting element 10 not to emit light;

At the beginning of the data writing-in phase, the driving circuit 11 controls to connect the second node N2 and the third node N3 under the control of the potential of the first node N1, so as to charge the energy storage circuit 32 through the data voltage Vdata, to change the potential of the first node N1 until the driving circuit 11 disconnects the second node N2 from the third node N3, at this time, the potential of N1 is Vdata+Vth, Vth is the threshold voltage of the driving transistor in the driving circuit 11;

In the light-emitting phase, the first light-emitting control circuit 12 controls to connect the power supply voltage terminal Vd and the second node N2 under the control of the second light-emitting control signal; the second light-emitting control circuit 15 controls to connect the third node N3 and the first electrode of the light-emitting element 10 under the control of the first light-emitting control signal; the driving circuit 11 drives the light-emitting element 10 to emit light.

In at least one embodiment of the present disclosure, the transistors included in the first light-emitting control circuit, the transistors included in the second light-emitting control circuit, and the transistors included in the first initialization circuit are all p-type transistors. The first light-emitting control signal and the second light-emitting control signal are provided by a same light-emitting control signal generating circuit, the first light-emitting control signal is the nth stage of light-emitting control signal provided by the light-emitting control signal generating circuit, the second light-emitting control signal is the (n+1)th stage of light-emitting control signal provided by the light-emitting control signal generating circuit, and n is a positive integer.

In a specific implementation, the first light-emitting control signal and the second light-emitting control signal may be two adjacent stages of light-emitting control signals provided by the same light-emitting control signal generating circuit.

In at least one embodiment of the present disclosure, the transistors included in the first control circuit, the transistors included in the data writing-in circuit, and the transistors included in the compensation control circuit are all p-type transistors, and the first scan signal and the second scan signal are provided by the same scan signal generating circuit;

The first scan signal is the mth stage of scan signal provided by the scan signal generating circuit, the second scan signal is the (m+1)th stage of scan signal provided by the scan signal generating circuit, and m is a positive integer.

In a specific implementation, the first scan signal and the second scan signal may be adjacent two stages of scan signals provided by the same scan signal generating circuit.

Optionally, the first control circuit includes a first transistor, and the first initialization circuit includes a second transistor;

A control electrode of the first transistor is electrically connected to the first scan line, a first electrode of the first transistor is electrically connected to the control node, and a second electrode of the first transistor is electrically connected to the first node electrical connection;

A control electrode of the second transistor is electrically connected to the second light-emitting control line, a first electrode of the second transistor is electrically connected to the first initial voltage terminal, and a second electrode of the second transistor is electrically connected to the control node.

Optionally, the first transistor is a dual-gate transistor; or, the first transistor is an oxide transistor.

The leakage current of the double-gate transistor and the leakage current of the oxide transistor are low. Therefore, in at least one embodiment of the present disclosure, the transistor in the first control circuit can be set as a double-gate transistor or an oxide thin film transistor to achieve low current leakage and ensure the stability of the potential of the control terminal of the driving circuit; but not limited to this.

Optionally, the first light-emitting control circuit includes a third transistor, and the second light-emitting control circuit includes a fourth transistor;

A control electrode of the third transistor is electrically connected to the second light-emitting control line, a first electrode of the third transistor is electrically connected to the power supply voltage terminal, and a second electrode of the third transistor is electrically connected to the second node;

A control electrode of the fourth transistor is electrically connected to the first light-emitting control line, a first electrode of the fourth transistor is electrically connected to the third node, and a second electrode of the fourth transistor is electrically connected to the first electrodes of the light-emitting element.

Optionally, the compensation control circuit includes a fifth transistor, and the data writing-in circuit includes a sixth transistor;

A control electrode of the fifth transistor is electrically connected to the first scan line, a first electrode of the fifth transistor is electrically connected to the control node, and a second electrode of the fifth transistor is electrically connected to the third node;

A control electrode of the sixth transistor is electrically connected to the second scan line, a first electrode of the sixth transistor is electrically connected to the data line, and a second electrode of the sixth transistor is electrically connected to the second node.

Optionally, the second initialization circuit includes a seventh transistor;

A control electrode of the seventh transistor is electrically connected to the second scan line, a first electrode of the seventh transistor is electrically connected to the second initial voltage terminal, and a second electrode of the seventh transistor is electrically connected to the first electrode of the light-emitting element.

Optionally, the energy storage circuit includes a storage capacitor, and the driving circuit includes a driving transistor;

A control electrode of the driving transistor is electrically connected to the first node, a first electrode of the driving transistor is electrically connected to the second node, and a second electrode of the driving transistor is electrically connected to the third node;

A first end of the storage capacitor is electrically connected to the first node, and the second end of the storage capacitor is electrically connected to the power supply voltage terminal.

Figure 4:
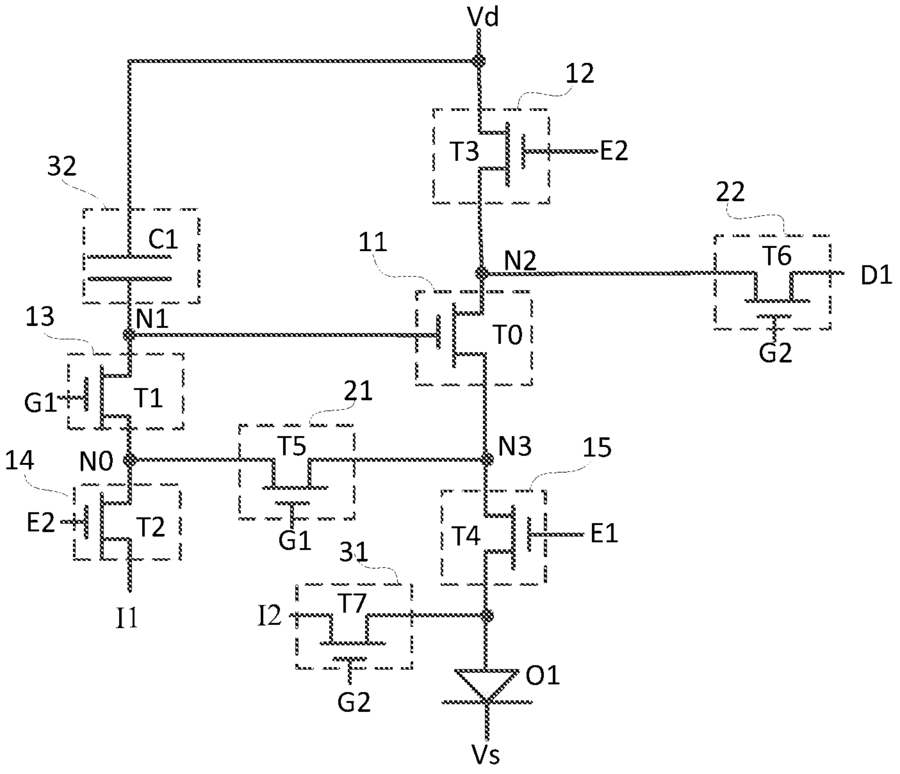
FIG. 4 is a circuit diagram of a pixel circuit according to at least one embodiment of the present disclosure.

As shown in FIG. 4, on the basis of at least one embodiment of the pixel circuit shown in FIG. 3, in the pixel circuit described in at least one embodiment of the present disclosure, the light-emitting element 10 is an organic light-emitting diode O1; the cathode of O1 is electrically connected to the low voltage terminal Vs, and the low voltage terminal Vs is used to provide the low voltage VSS;

The first control circuit 13 includes a first transistor T1, and the first initialization circuit 14 includes a second transistor T2;

The gate electrode of the first transistor T1 is electrically connected to the first scan line G1, the source electrode of the first transistor T1 is electrically connected to the control node N0, and the drain electrode of the first transistor T1 is electrically connected to the first node N1;

The gate electrode of the second transistor T2 is electrically connected to the second light-emitting control line E2, the source electrode of the second transistor T2 is electrically connected to the first initial voltage terminal I1, and the drain electrode of the second transistor T2 is electrically connected to the control node NO;

The first light-emitting control circuit 12 includes a third transistor T3, and the second light-emitting control circuit 15 includes a fourth transistor T4;

The gate electrode of the third transistor T3 is electrically connected to the second light-emitting control line E2, the source electrode of the third transistor T3 is electrically connected to the power supply voltage terminal Vd, and the drain electrode of the third transistor T3 is electrically connected to the second node N3;

The gate electrode of the fourth transistor T4 is electrically connected to the first light-emitting control line E1, the source electrode of the fourth transistor T4 is electrically connected to the third node N3, and the drain electrode of the fourth transistor T4 is electrically connected to the anode of O1;

The compensation control circuit 21 includes a fifth transistor T5, and the data writing-in circuit 22 includes a sixth transistor T6;

The gate electrode of the fifth transistor T5 is electrically connected to the first scan line G1, the source electrode of the fifth transistor T5 is electrically connected to the control node N0, and the drain electrode of the fifth transistor T5 is electrically connected to the third node N3;

The gate electrode of the sixth transistor T6 is electrically connected to the second scan line G2, the source electrode of the sixth transistor T6 is electrically connected to the data line Data, and the drain electrode of the sixth transistor T6 is electrically connected to the second node N2;

The second initialization circuit 31 includes a seventh transistor T7;

The gate electrode of the seventh transistor T7 is electrically connected to the second scan line G2, the source electrode of the seventh transistor T7 is electrically connected to the second initial voltage terminal I2, and the drain electrode of the seventh transistor T7 is electrically connected to the anode of O1;

The energy storage circuit 32 includes a storage capacitor C1, and the driving circuit 10 includes a driving transistor T0;

The gate electrode of the driving transistor T0 is electrically connected to the first node N1, the source electrode of the driving transistor T0 is electrically connected to the second node N2, and the drain electrode of the driving transistor T0 is electrically connected to the third node N3;

The first end of the storage capacitor C1 is electrically connected to the first node N1, and the second end of the storage capacitor C1 is electrically connected to the power supply voltage terminal Vd.

In at least one embodiment of the pixel circuit shown in FIG. 4, all transistors are p-type transistors, and all transistors may be low temperature polysilicon transistors, but not limited thereto.

In at least one embodiment of the pixel circuit shown in FIG. 4, T1 can be a double-gate transistor to reduce leakage current, and T2 and T5 can be single-gate transistors to optimize layout space.

In at least one embodiment of the pixel circuit shown in FIGS. 4, T3 and T4 respond to different light-emitting control signals, and T5 and T6 respond to different scan signals, so as to ensure the normal operation of three timing of the initialization, data writing-in and threshold compensation, OLED light-emitting, to ensure threshold voltage compensation and display effects.

Figure 5:
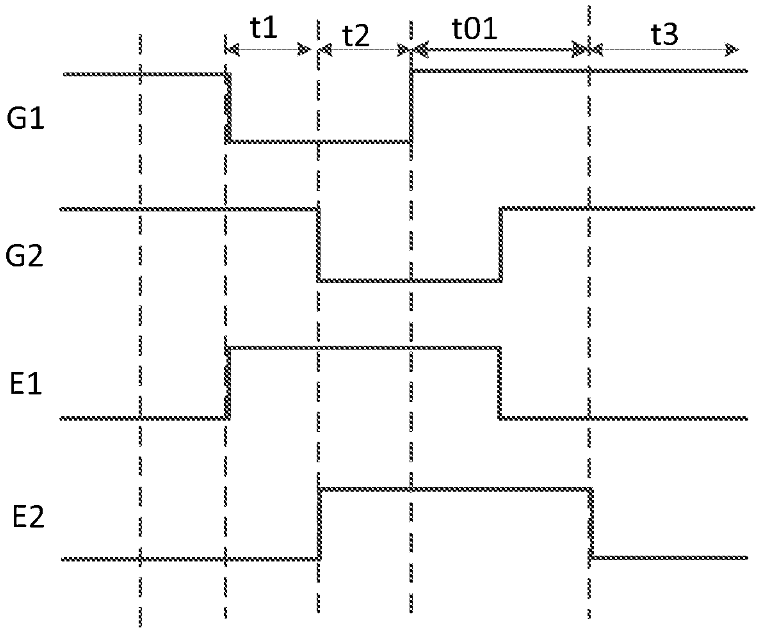
FIG. 5 is a timing diagram of the pixel circuit shown in FIG. 4 according to at least one embodiment of the present disclosure.

As shown in FIG. 5, when at least one embodiment of the pixel circuit shown in FIG. 4 of the present disclosure is in operation, the display period may include an initialization phase t1, a data writing-in phase t2 and a light-emitting phase t3 that are set successively;

In the initialization phase t1, G1 provides a low voltage signal, G2 provides a high voltage signal, E1 provides a high voltage signal, E2 provides a low voltage signal, T1, T2 and T3 are all turned on to write the power supply voltage VDD provided by Vd into N2, and write the first initial voltage Vi1 provided by I1 into N1, to reset the gate-source voltage of T0, so that T0 is in an on-bias state, which can improve the hysteresis effect of T0 and eliminate afterimages;

In the data writing-in phase t2, both G1 and G2 provide low voltage signals, EM1 and EM2 provide high voltage signals, data line D1 provides data voltage Vdata, and T1, T5 and T6 are all turned on to write Vdata into N2 and control to connect N0 and N3, control to connect N0 and N1, so as to connect N1 and N3;

At the beginning of the data writing-in phase t2, T0 is turned on to charge C1 through Vdata to increase the potential of N1 until the potential of N1 becomes Vdata+Vth, and T0 is turned off;

In the light-emitting phase t3, G1 and G2 both provide high voltage signals, E1 and E2 both provide low voltage signals, T0, T3 and T4 are turned on, and T0 drives O1 to emit light.

As shown in FIG. 5, the first scan signal provided by G1 and the second scan signal provided by G2 can be two adjacent stages of scan signals provided by the same scan signal generating circuit, the first light-emitting control signal provided by E1 and the second light-emitting control signal provided by E2 can be two adjacent stages of light-emitting control signals provided by the same light-emitting control signal generating circuit, thereby reducing the number of scan signal generating circuits used by the display device and the number of light-emitting control signal generating circuits used by the display device, simplifying the structure and saving cost.

In FIG. 5, the first interval t01 between t2 and t3 is a redundant timing to ensure that G1, G2 and G3 share one scan signal generating circuit, and ensure that E1 and E2 share one light-emitting control signal generating circuit.

As shown in FIG. 4 and FIG. 5, the pixel driving circuit needs to turn on the driving transistor T0 in the data writing-in phase. Therefore, the voltage difference Vi1−VDD between the first initial voltage Vi1 and the power supply voltage VDD is less than the threshold voltage Vth of T0. An absolute value of VDD can be greater than the absolute value of Vth by 1.5 times or more, for example, the absolute value of VDD can be 1.6 times, 1.8 times, 2 times, etc. of the absolute value of Vth, so as to ensure that the bias effect can be quickly achieved in a relatively short time.

Optionally, the voltage value of Vi1 is greater than or equal to −4V and less than or equal to −2V, the voltage value of VDD is greater than or equal to 4V and less than or equal to 5.5V, and the voltage value of Vth is greater than or equal to −3.5V and less than or equal to −2V.

In at least one embodiment of the present disclosure, the voltage value of Vi2 is greater than or equal to −4V and less than or equal to −2V.

Figure 6:
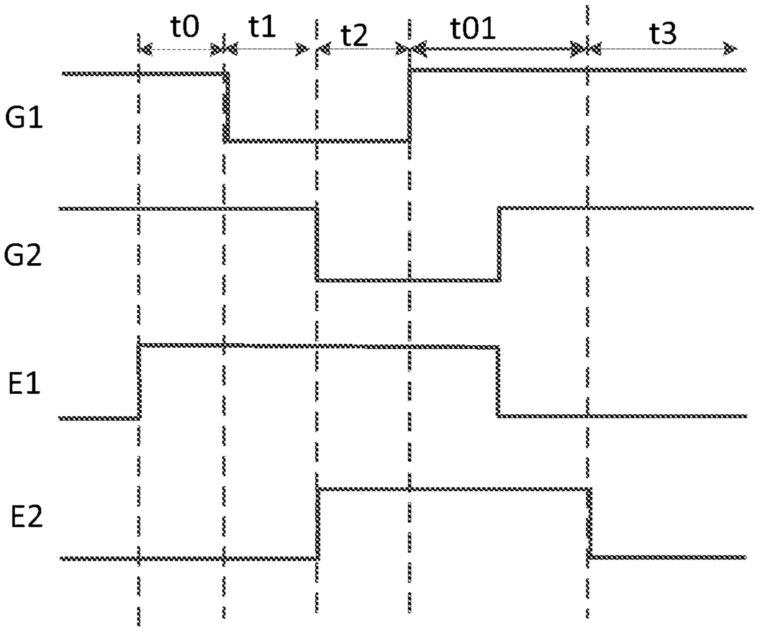
FIG. 6 is another timing diagram of the pixel circuit shown in FIG. 4 according to at least one embodiment of the present disclosure.

As shown in FIG. 6, during operation of at least one embodiment of the pixel circuit shown in FIG. 4 of the present disclosure, the display period may include a preset phase t0, an initialization phase t1, a data writing-in phase t2 and a light-emitting phase t3 that are set in sequence;

In the preset phase t0, G1 and G2 provide high voltage signals, E1 provides a high voltage signal, E2 provides a low voltage signal, and T4 is turned off, so that in the initialization phase t1, the operation of resetting the gate-source voltage of T0 is not affected;

In the preset phase t0, T1, T5 and T6 are turned off, and T2 and T3 are turned on;

In the initialization phase t1, G1 provides a low voltage signal, G2 provides a high voltage signal, E1 provides a high voltage signal, E2 provides a low voltage signal, T1, T2 and T3 are all turned on to write the power supply voltage VDD provided by Vd into N2, and write the first initial voltage Vi1 provided by I1 into N1 to reset the gate-source voltage of T0, so that T0 is in an on-bias state, which can improve the hysteresis effect of T0 and eliminate afterimages;

In the data writing-in phase t2, both G1 and G2 provide low voltage signals, EM1 and EM2 provide high voltage signals, data line D1 provides data voltage Vdata, and T1, T5 and T6 are all turned on to write Vdata into N2 and control to connect N0 and N3, control to connect N0 and N1, so as to connect N1 and N3;

At the beginning of the data writing-in phase t2, T0 is turned on to charge C1 through Vdata to increase the potential of N1 until the potential of N1 becomes Vdata+Vth, and T0 is turned off;

In the light-emitting phase t3, G1 and G2 both provide high voltage signals, E1 and E2 both provide low voltage signals, T0, T3 and T4 are turned on, and T0 drives O1 to emit light.

As shown in FIG. 6, the preset phase to is adjacent to the initialization phase t1.

As shown in FIG. 6, the first light-emitting control signal provided by E1 and the second light-emitting control signal provided by E2 may be light-emitting control signals provided by different light-emitting control signal generating circuits;

The first scan signal provided by G1 and the second scan signal provided by G2 can be two adjacent stages of scan signals provides by the same scan signal generating circuit, thereby reducing the number of scan signal generating circuits used in the display device, simplifying the structure, and saving costs.

Figure 7:
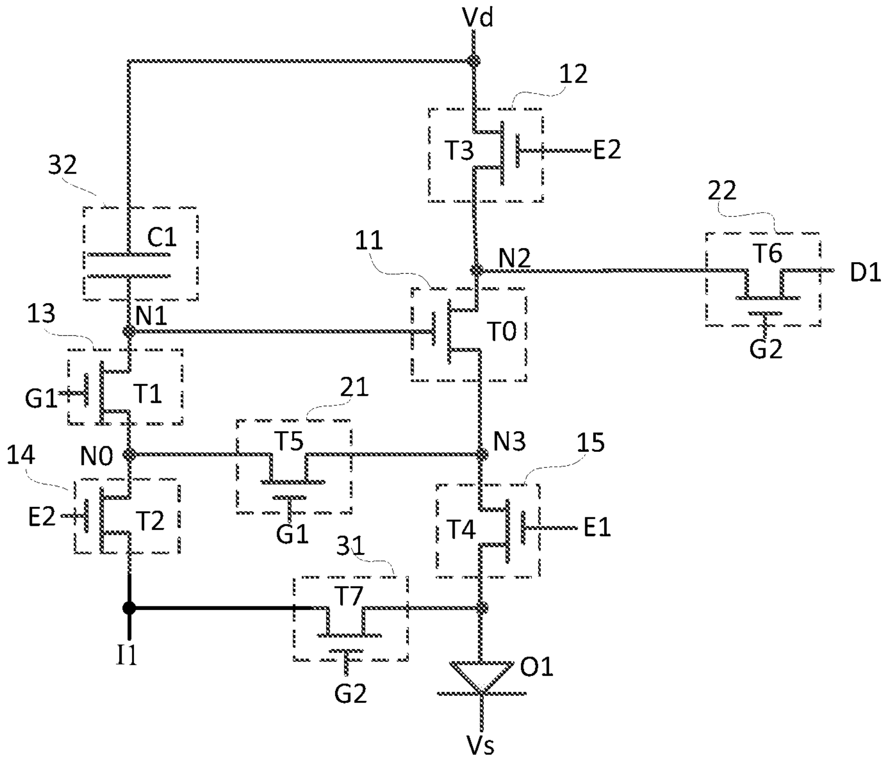
FIG. 7 is a circuit diagram of a pixel circuit according to at least one embodiment of the present disclosure.

As shown in FIG. 7, on the basis of at least one embodiment of the pixel circuit shown in FIG. 3, in the pixel circuit described in at least one embodiment of the present disclosure, the light-emitting element 10 is an organic light-emitting diode O1; the cathode of O1 is electrically connected to the low voltage terminal Vs, and the low voltage terminal Vs is used to provide the low voltage VSS;

The first control circuit 13 includes a first transistor T1, and the first initialization circuit 14 includes a second transistor T2;

The gate electrode of the first transistor T1 is electrically connected to the first scan line G1, the source electrode of the first transistor T1 is electrically connected to the control node N0, and the drain electrode of the first transistor T1 is electrically connected to the first node N1;

The gate electrode of the second transistor T2 is electrically connected to the second light-emitting control line E2, the source electrode of the second transistor T2 is electrically connected to the first initial voltage terminal I1, and the drain electrode of the second transistor T2 is electrically connected to the control node NO;

The first light-emitting control circuit 12 includes a third transistor T3, and the second light-emitting control circuit 15 includes a fourth transistor T4;

The gate electrode of the third transistor T3 is electrically connected to the second light-emitting control line E2, the source electrode of the third transistor T3 is electrically connected to the power supply voltage terminal Vd, and the drain electrode of the third transistor T3 is electrically connected to the second node N3;

The gate electrode of the fourth transistor T4 is electrically connected to the first light-emitting control line E1, the source electrode of the fourth transistor T4 is electrically connected to the third node N3, and the drain electrode of the fourth transistor T4 is electrically connected to the anode of O1;

The compensation control circuit 21 includes a fifth transistor T5, and the data writing-in circuit 22 includes a sixth transistor T6;

The gate electrode of the fifth transistor T5 is electrically connected to the first scan line G1, the source electrode of the fifth transistor T5 is electrically connected to the control node N0, and the drain electrode of the fifth transistor T5 is electrically connected to the third node N3;

The gate electrode of the sixth transistor T6 is electrically connected to the second scan line G2, the source electrode of the sixth transistor T6 is electrically connected to the data line Data, and the drain electrode of the sixth transistor T6 is electrically connected to the second node N2;

The second initialization circuit 31 includes a seventh transistor T7;

The gate electrode of the seventh transistor T7 is electrically connected to the second scan line G2, the source electrode of the seventh transistor T7 is electrically connected to the first initial voltage terminal I1, and the drain electrode of the seventh transistor T7 is electrically connected to the anode of O1;

The energy storage circuit 32 includes a storage capacitor C1, and the driving circuit 10 includes a driving transistor T0;

The gate electrode of the driving transistor T0 is electrically connected to the first node N1, the source electrode of the driving transistor T0 is electrically connected to the second node N2, and the drain electrode of the driving transistor T0 is electrically connected to the third node N3;

The first end of the storage capacitor C1 is electrically connected to the first node N1, and the second end of the storage capacitor C1 is electrically connected to the power supply voltage terminal Vd.

In at least one embodiment of the pixel circuit shown in FIG. 7, all transistors are p-type transistors, and all transistors may be low temperature polysilicon transistors, but not limited thereto.

The difference between the pixel circuit shown in FIG. 7 and the pixel circuit shown in FIG. 4 is that the source electrode of the seventh transistor T7 is electrically connected to the first initial voltage terminal I1, the second initial voltage terminal and the first initial voltage terminal I1 are the same initial voltage terminal. The working process of the pixel circuit shown in FIG. 7 may be consistent with the working process of the pixel circuit shown in FIG. 4.

The driving method described in the embodiment of the present disclosure is applied to the above-mentioned pixel circuit, and the display period includes an initialization phase; the driving method includes:

In the initialization phase, controlling, by the first light-emitting control circuit, to connect the power supply terminal and the second node under the control of the second light-emitting control signal; controlling, by the first initialization circuit, to write the first initial voltage into the control node under the control of the second light-emitting control signal, and controlling, by the first control circuit, to connect the first node and the control node under the control of the first scan signal, so as to write the first initial voltage into the first node.

In the driving method according to the embodiment of the present disclosure, before the data voltage is written to the first end of the driving circuit, the first control circuit and the first initialization circuit control to write the first initial voltage into the control node, to initialize the potential of the first node to the first initial voltage; the first light-emitting control circuit controls to write the power supply voltage into the first end of the driving circuit under the control of the second light-emitting control signal, so as to provide a bias voltage to the driving transistor in the driving circuit, sot that the driving transistor is kept in the reset state, thereby improving the hysteresis of the driving transistor and eliminating afterimages.

In at least one embodiment of the present disclosure, the pixel circuit further includes a compensation control circuit, a data writing-in circuit and an energy storage circuit; the display period further includes a data writing-in phase and a light-emitting phase arranged after the initialization phase; the driving method also includes:

In the data writing-in phase, writing, by the data writing-in circuit, the data voltage into the second node under the control of the second scan signal, and controlling, by the compensation control circuit, to connect the third node and the control node under the control of the first scan signal;

At the beginning of the data writing-in phase, controlling, by the driving circuit, to connect the second node and the third node under the control of the potential of the first node, so as to charge the energy storage circuit through the data voltage and change the potential of the first node, until the driving circuit is turned off, at this time, the potential of the first node is related to the threshold voltage of the driving transistor in the driving circuit;

In the light-emitting phase, controlling, by the first light-emitting control circuit, to connect the power supply voltage terminal and the first end of the driving circuit under the control of the second light-emitting control signal, and controlling, by the second light-emitting control circuit, to connect the second end of the driving circuit and the first electrode of the light-emitting element under the control of the first light-emitting control signal, and driving, by the driving circuit, the light-emitting element to emit light.

During specific implementation, the pixel circuit described in at least one embodiment of the present disclosure may further include a compensation control circuit, a data writing-in circuit and an energy storage circuit, the data writing-in circuit controls to write the data voltage, and the compensation control circuit controls to compensate the threshold voltage.

Optionally, the pixel circuit further includes a second initialization circuit, and the driving method described in at least one embodiment of the present disclosure further includes:

In the data writing-in phase, writing, by the second initializing circuit, a second initial voltage into the first electrode of the light-emitting element, so that the light-emitting element does not emit light, and the residual charge of the first electrode of the light-emitting element is removed.

Optionally, the display period further includes a preset phase that is set before the initialization phase and is immediately adjacent to the initialization phase, and the driving method according to at least one embodiment of the present disclosure further includes:

In the preset phase, the initialization phase, and the data writing-in phase, controlling, by the second light-emitting control circuit, to disconnect the second end of the driving circuit from the first electrode of the light-emitting element under the control of the first light-emitting control signal.

In the preset phase, controlling, by the second light-emitting control circuit, to disconnect the second end of the driving circuit from the first electrode of the light-emitting element under the control of the first light-emitting control signal, so that in the initializing phase, the reset operation of the gate-source voltage of the driving transistor in the driving circuit is not affected.

The display device according to the embodiment of the present disclosure includes the above-mentioned pixel circuit.

In the embodiments of the present disclosure, the display device may be any product or member having a display function, e.g., mobile phone, tablet computer, television, display, laptop computer, digital photo frame or navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel circuit, comprising a light-emitting element, a driving circuit, a first light-emitting control circuit, a first control circuit, a first initialization circuit and a second light-emitting control circuit, wherein, the first control circuit is electrically connected to a first scan line, a first node and a control node respectively, and is configured to control to connect the first node and the control node under the control of a first scan signal provided by the first scan line;

the first initialization circuit is respectively electrically connected to a second light-emitting control line, a first initial voltage terminal and the control node, and is configured to write a first initial voltage provided by the first initial voltage terminal into the control node under the control of a second light-emitting control signal provided by the second light-emitting control line;

the first light-emitting control circuit is respectively electrically connected to the second light-emitting control line, a power supply voltage terminal and a second node, and is configured to control to connect the power supply voltage terminal and the second node under the control of the second light-emitting control signal;

the second light-emitting control circuit is respectively electrically connected to the first light-emitting control line, a third node and a first electrode of the light-emitting element, and is configured to control to connect the third node and the first electrode of the light-emitting element under the control of the first light-emitting control signal provided by the first light-emitting control line;

a control end of the driving circuit is electrically connected to the first node, a first end of the driving circuit is electrically connected to the second node, a second end of the driving circuit is electrically connected to the third node, the driving circuit is configured to control to connect the second node and the third node under the control of a potential of the first node;

a second electrode of the light-emitting element is electrically connected to a first voltage terminal.

2. The pixel circuit according to claim 1, further comprising a compensation control circuit and a data writing-in circuit;

the compensation control circuit is electrically connected to the first scan line, the control node and the third node respectively, and is configured to control to connect the control node and the third node under the control of the first scan signal provided by the first scan line;

the data writing-in circuit is electrically connected to a second scan line, a data line and the second node respectively, and is configured to write a data voltage on the data line into the second node under the control of a second scan signal.

3. The pixel circuit according to claim 2, wherein transistors included in the first control circuit, transistors included in the data writing-in circuit, and transistors included in the compensation control circuit are all p-type transistors, and the first scan signal and the second scan signal are provided by a same scan signal generating circuit;

the first scan signal is an mth stage of scan signal provided by the scan signal generating circuit, the second scan signal is an (m+1)th stage of scan signal provided by the scan signal generating circuit, and m is a positive integer.

4. The pixel circuit according to claim 2, wherein the compensation control circuit comprises a fifth transistor, and the data writing-in circuit comprises a sixth transistor;

a control electrode of the fifth transistor is electrically connected to the first scan line, a first electrode of the fifth transistor is electrically connected to the control node, and a second electrode of the fifth transistor is electrically connected to the third node;

a control electrode of the sixth transistor is electrically connected to the second scan line, a first electrode of the sixth transistor is electrically connected to the data line, and a second electrode of the sixth transistor is electrically connected to the second node.

5. The pixel circuit according to claim 2, further comprising a second initialization circuit;

the second initialization circuit is respectively electrically connected to the second scan line, a second initial voltage terminal and the first electrode of the light-emitting element, and is configured to write a second initial voltage provided by the second initial voltage terminal into the first electrode of the light-emitting element under the control of the second scan signal provided by the second scan line.

6. The pixel circuit according to claim 2, further comprising an energy storage circuit;

a first end of the energy storage circuit is electrically connected to the first node, a second end of the energy storage circuit is electrically connected to the power supply voltage terminal, and the energy storage circuit is configured to store electrical energy and control a potential of the first node.

7. The pixel circuit according to claim 1, further comprising a second initialization circuit;

the second initialization circuit is respectively electrically connected to the second scan line, a second initial voltage terminal and the first electrode of the light-emitting element, and is configured to write a second initial voltage provided by the second initial voltage terminal into the first electrode of the light-emitting element under the control of the second scan signal provided by the second scan line.

8. The pixel circuit according to claim 7, wherein the second initialization circuit comprises a seventh transistor;

a control electrode of the seventh transistor is electrically connected to the second scan line, a first electrode of the seventh transistor is electrically connected to the second initial voltage terminal, and a second electrode of the seventh transistor is electrically connected to the first electrode of the light-emitting element.

9. The pixel circuit according to claim 1, further comprising an energy storage circuit;

a first end of the energy storage circuit is electrically connected to the first node, a second end of the energy storage circuit is electrically connected to the power supply voltage terminal, and the energy storage circuit is configured to store electrical energy and control a potential of the first node.

10. The pixel circuit according to claim 9, wherein the energy storage circuit includes a storage capacitor, and the driving circuit includes a driving transistor;

a control electrode of the driving transistor is electrically connected to the first node, a first electrode of the driving transistor is electrically connected to the second node, and a second electrode of the driving transistor is electrically connected to the third node;

a first end of the storage capacitor is electrically connected to the first node, and the second end of the storage capacitor is electrically connected to the power supply voltage terminal.

11. The pixel circuit according to claim 1, wherein transistors included in the first light-emitting control circuit, transistors included in the second light-emitting control circuit, and transistors included in the first initialization circuit are all p-type transistors, the first light-emitting control signal and the second light-emitting control signal are provided by a same light-emitting control signal generating circuit, the first light-emitting control signal is an nth stage of light-emitting control signal provided by the light-emitting control signal generating circuit, the second light-emitting control signal is an (n+1)th stage of light-emitting control signal provided by the light-emitting control signal generating circuit, and n is a positive integer.

12. The pixel circuit according to claim 1, wherein the first control circuit comprises a first transistor, and the first initialization circuit comprises a second transistor;

a control electrode of the first transistor is electrically connected to the first scan line, a first electrode of the first transistor is electrically connected to the control node, and a second electrode of the first transistor is electrically connected to the first node;

a control electrode of the second transistor is electrically connected to the second light-emitting control line, a first electrode of the second transistor is electrically connected to the first initial voltage terminal, and a second electrode of the second transistor is electrically connected to the control node.

13. The pixel circuit according to claim 12, wherein the first transistor is a dual-gate transistor; or the first transistor is an oxide transistor.

14. The pixel circuit according to claim 1, wherein the first light-emitting control circuit includes a third transistor, and the second light-emitting control circuit includes a fourth transistor;

a control electrode of the third transistor is electrically connected to the second light-emitting control line, a first electrode of the third transistor is electrically connected to the power supply voltage terminal, and a second electrode of the third transistor is electrically connected to the second node;

a control electrode of the fourth transistor is electrically connected to the first light-emitting control line, a first electrode of the fourth transistor is electrically connected to the third node, and a second electrode of the fourth transistor is electrically connected to the first electrode of the light-emitting element.

15. A driving method, applied to the pixel circuit according to claim 1, wherein a display period includes an initialization phase; the driving method comprises:

in the initialization phase, controlling, by the first light-emitting control circuit, to connect the power supply voltage terminal and the second node under the control of the second light-emitting control signal; controlling, by the first initialization circuit, to write the first initial voltage into the control node under the control of the second light-emitting control signal, and controlling, by the first control circuit, to connect the first node and the control node under the control of the first scan signal, so as to write the first initial voltage into the first node.

16. The driving method according to claim 15, wherein the pixel circuit further comprises a compensation control circuit, a data writing-in circuit and an energy storage circuit; the display period further comprises a data writing-in phase and a light-emitting phase arranged after the initialization phase; the driving method further includes:

in the data writing-in phase, writing, by the data writing-in circuit, the data voltage into the second node under the control of the second scan signal, and controlling, by the compensation control circuit, to connect the third node and the control node under the control of the first scan signal;

at the beginning of the data writing-in phase, controlling, by the driving circuit, to connect the second node and the third node under the control of a potential of the first node, so as to charge the energy storage circuit through the data voltage and change the potential of the first node, until the driving circuit is turned off;

in the light-emitting phase, controlling, by the first light-emitting control circuit, to connect the power supply voltage terminal and the first end of the driving circuit under the control of the second light-emitting control signal, and controlling, by the second light-emitting control circuit, to connect the second end of the driving circuit and the first electrode of the light-emitting element under the control of the first light-emitting control signal, and driving, by the driving circuit, the light-emitting element to emit light.

17. The driving method according to claim 16, wherein the pixel circuit further comprises a second initialization circuit, the driving method further comprises:

in the data writing-in phase, writing, by the second initializing circuit, a second initial voltage into the first electrode of the light-emitting element, so that the light-emitting element does not emit light.

18. The driving method according to claim 17, wherein the display period further includes a preset phase that is set before the initialization phase and is immediately adjacent to the initialization phase, and the driving method further includes:

in the preset phase, the initialization phase, and the data writing-in phase, controlling, by the second light-emitting control circuit, to disconnect the second end of the driving circuit from the first electrode of the light-emitting element under the control of the first light-emitting control signal.

19. The driving method according to claim 16, wherein the display period further includes a preset phase that is set before the initialization phase and is immediately adjacent to the initialization phase, and the driving method further includes:

in the preset phase, the initialization phase, and the data writing-in phase, controlling, by the second light-emitting control circuit, to disconnect the second end of the driving circuit from the first electrode of the light-emitting element under the control of the first light-emitting control signal.

20. A display device comprising a pixel circuit according to claim 1.

* * * * *